United States Patent [19]
Kyrtsos et al.

[11] Patent Number: 5,182,712
[45] Date of Patent: Jan. 26, 1993

[54] DYNAMIC PAYLOAD MONITOR

[75] Inventors: Christos T. Kyrtsos, Peoria; Adam J. Gudat, Edelstein, both of Ill.

[73] Assignee: Caterpillar Inc., Peoria, Ill.

[21] Appl. No.: 582,071

[22] Filed: Sep. 14, 1990

[51] Int. Cl.$^5$ ............................................. G01G 19/08
[52] U.S. Cl. ........................... 364/424.07; 364/424.01; 364/567; 177/141
[58] Field of Search .................. 364/567, 568, 424.01, 364/558; 177/25.14, 137, 141

[56] References Cited
U.S. PATENT DOCUMENTS

| | | | |
|---|---|---|---|
| 4,588,038 | 5/1986 | Takagi | 177/141 |
| 4,630,227 | 12/1986 | Hagenbuch | 364/567 |
| 4,635,739 | 1/1987 | Foley et al. | 177/45 |
| 4,691,792 | 9/1987 | Shintani | 177/1 |
| 4,835,719 | 5/1989 | Sorrells | 364/567 |
| 4,839,835 | 6/1989 | Hagenbuch | 364/567 |
| 4,845,648 | 7/1989 | Hagenbuch | 364/567 |
| 4,919,222 | 4/1990 | Kyrtsos et al. | 177/139 |
| 5,067,572 | 11/1991 | Kyrtsos | 177/139 |
| 5,070,953 | 10/1991 | Kyrtsos et al. | 177/25.14 |
| 5,082,071 | 1/1992 | Kyrtsos et al. | 177/25.14 |

FOREIGN PATENT DOCUMENTS 0162608 11/1985 European Pat. Off.
WO8901137 2/1989 PCT Int'l Appl.

OTHER PUBLICATIONS

Patent Abstract of Japan, vol. 8, No. 175, AP-A-5-9-70919 of Apr. 21, 1984.

Primary Examiner—Thomas G. Black
Attorney, Agent, or Firm—James R. Yee

[57] ABSTRACT

An apparatus determines the payload carried in a work vehicle by monitoring the pressure of a fluid contained within front and rear suspension struts. The struts are connected in supporting relation between a load carrying portion and a ground engaging portion of the work vehicle such that a compression condition of the strut is detected while the work vehicle is in motion. Moreover, a pressure differential corresponding to the compression condition is indicative of the magnitude of the payload supported by the strut.

14 Claims, 4 Drawing Sheets

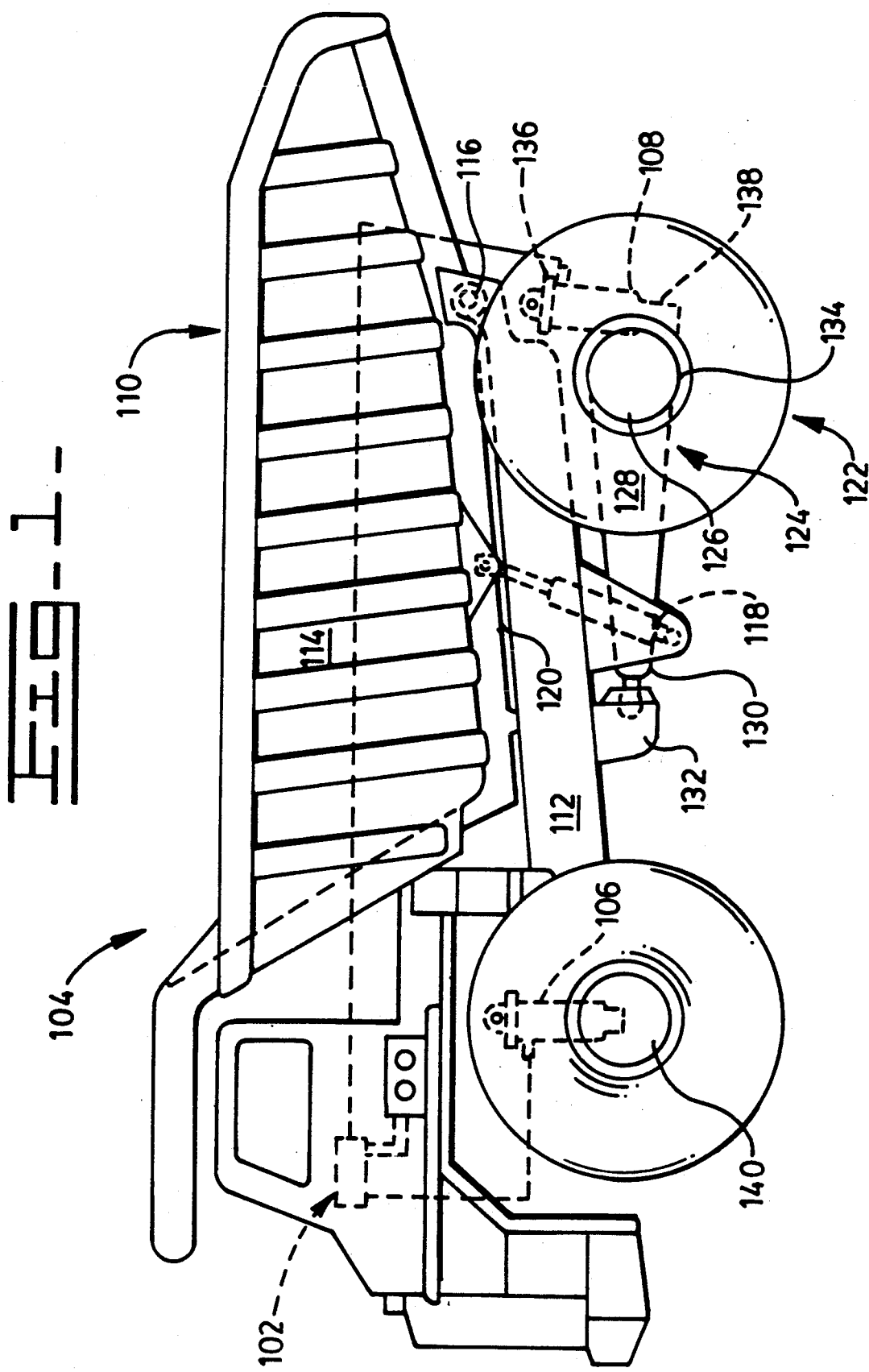

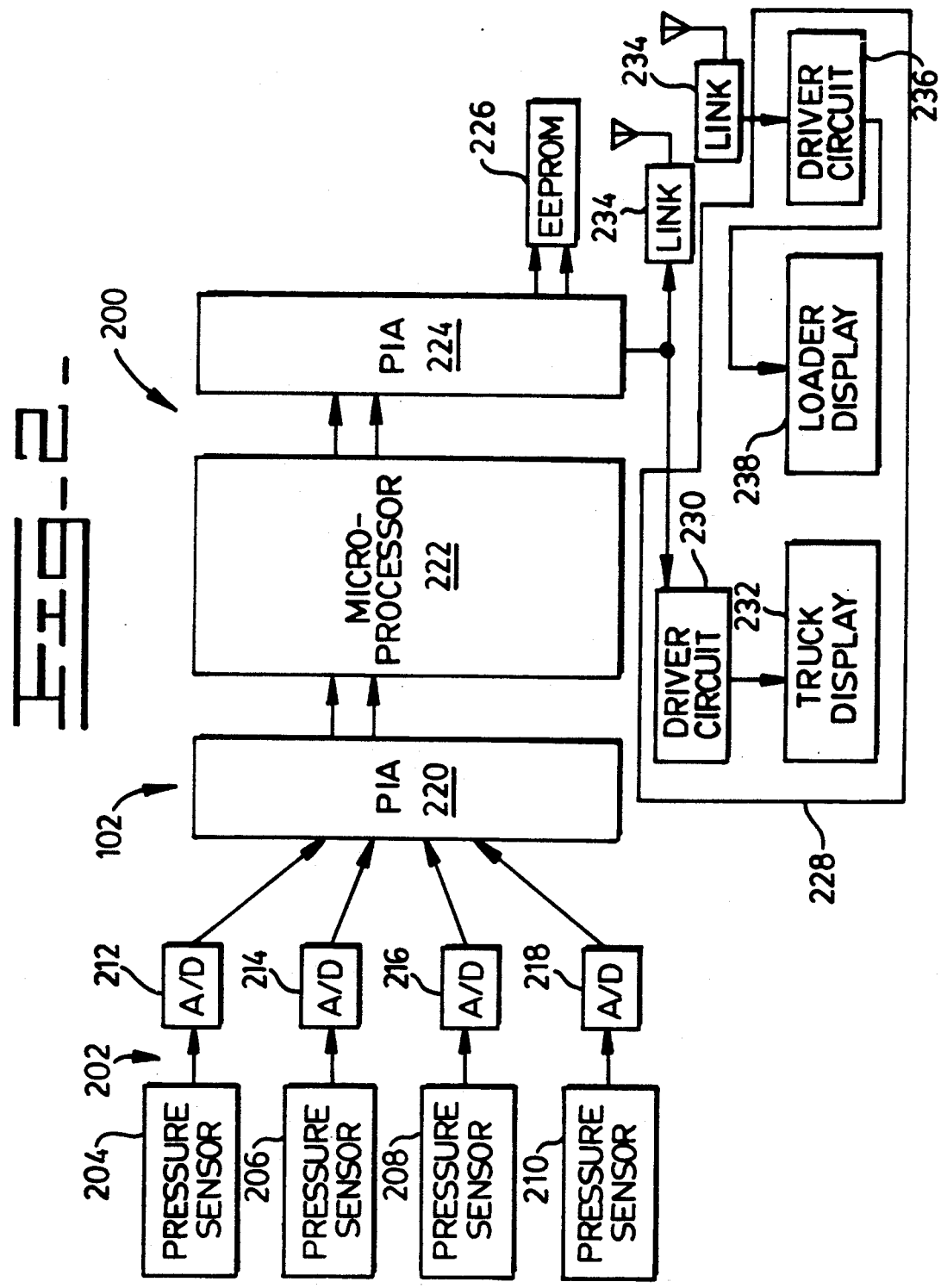

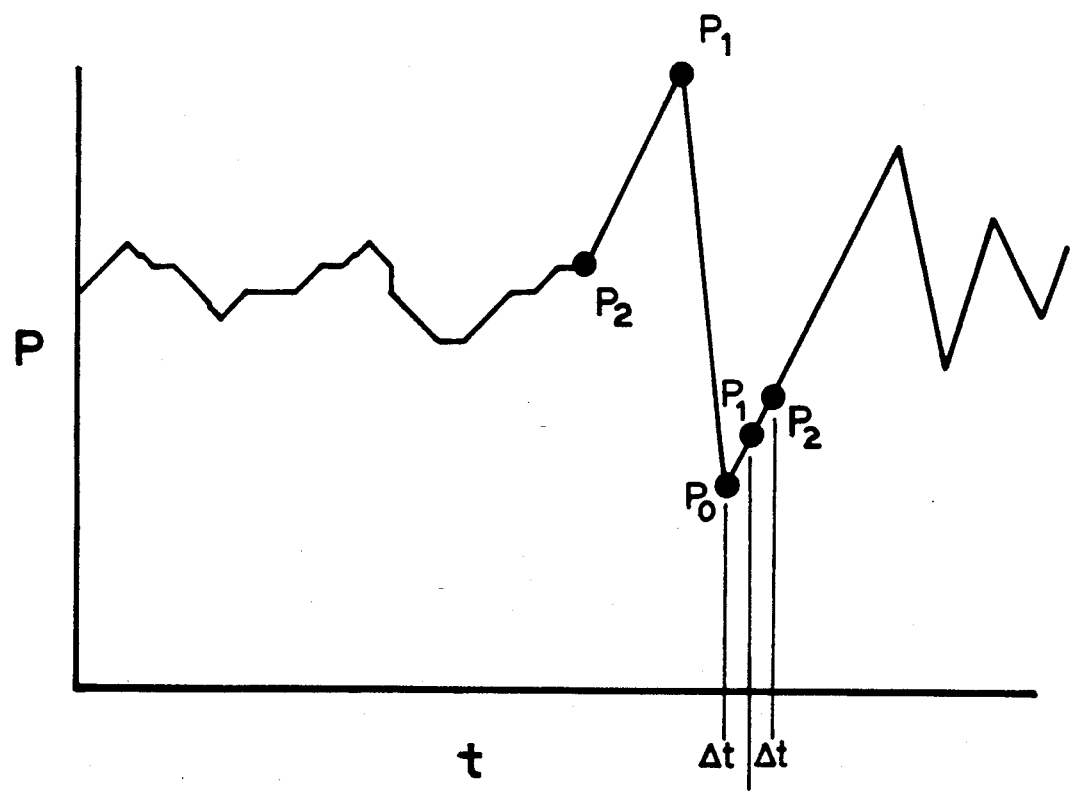

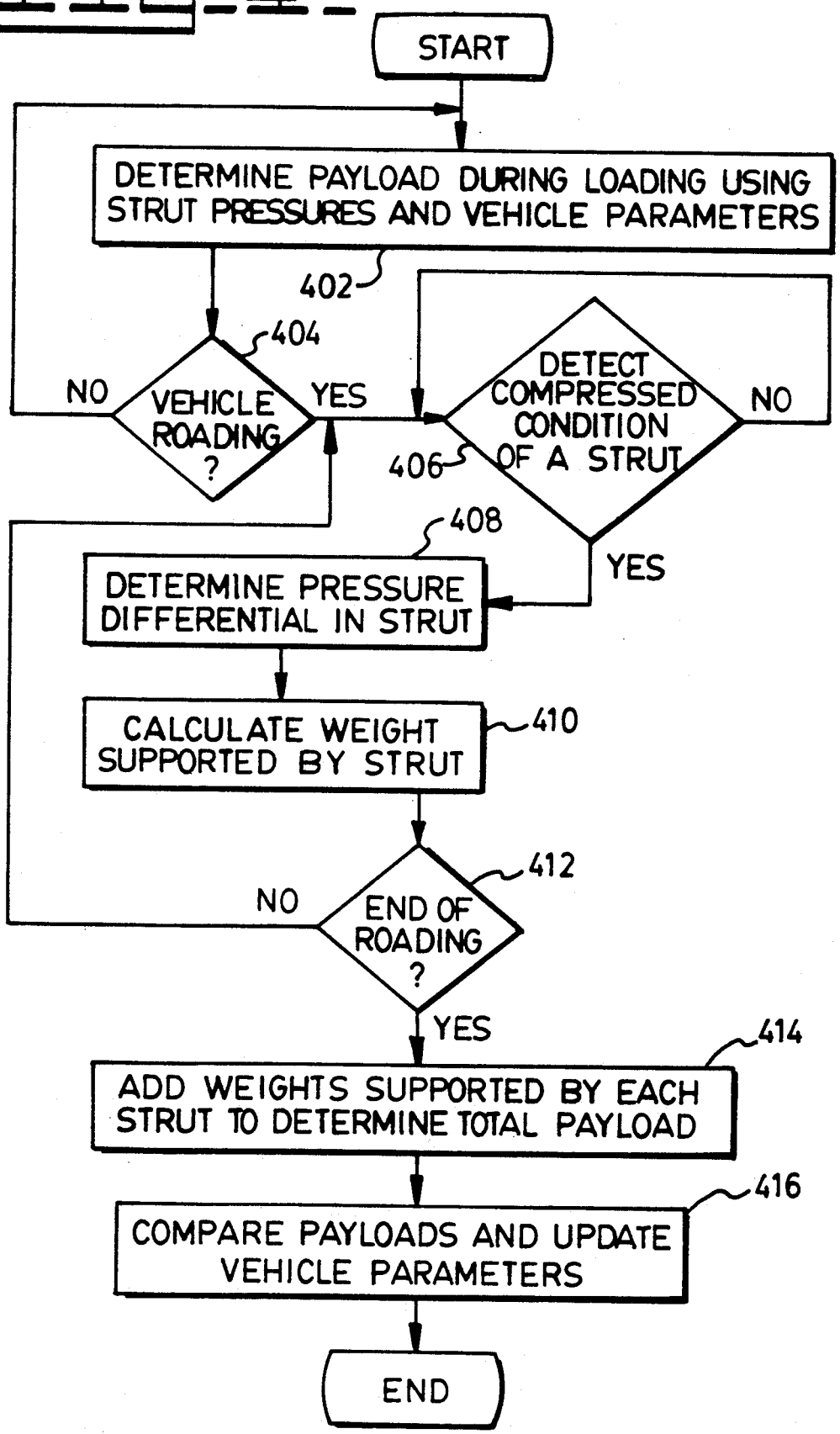

DYNAMIC PAYLOAD MONITOR

DESCRIPTION

1. Technical Field

This invention relates generally to an apparatus for accurately determining the payload carried by a work vehicle, and more particularly, to an apparatus which correlates the suspension strut pressures into an accurate indication of work vehicle payload during vehicle travel.

2. Background Art

In the field of off-highway trucks used, for example, in mining operations, it is desirable that an accurate record be kept of the quantity of material removed from the mining site. This information can be used to calculate mine and truck productivity as well as aid in forecasting profitability and work schedules.

Previously, mine operators have used traditional fixed scales to obtain the accuracy considered necessary to make the payload information useful. The fixed scales are typically located along the truck haul route such that a minimum amount of time is expended in weighing the trucks. However, as the mining operation progresses, the truck haul routes are altered to relocate the fixed scales to more advantageous locations. This takes time and adds unneeded costs. Further, while the truck is being weighed, it cannot be performing useful work, and thus, the weighing operation intended to measure truck productivity is a negative influence on truck productivity. An alternate method for determining mine productivity simply involves establishing a standard payload and applying this standard to the number of completed truck loads. Obviously, this method reduces unproductive truck time, but the resultant inaccuracy is significant. It is desirable to have a weighing scheme which is route independent and yet accurate.

Previously, on board payload weighing systems have been used in attempts to provide useful payload information. However, prior on board payload weighing systems are notoriously inaccurate under actual roading conditions. These on board systems have relied upon calibration without consideration to the effects of load distribution caused by material placement and unlevel roading conditions. It would be advantageous for an on board payload monitor to accurately detect load substantially independent of load position and underfoot conditions. An important benefit to accurate payload monitoring is that the possibility of overloading a truck is greatly reduced and, consequently, extreme tire wear normally associated with overloaded trucks is minimized.

One system, as disclosed in U.S. Pat. No. 4,635,739 issued to D. Foley et. al. on Jan. 3, 1987, have shown that strut pressure can be an acurate indicator of payload. The apparatus disclosed therein includes an electronic control which monitors each of the strut pressures, compensates for various inaccuracies introduced by load distribution and vehicle attitude, and correlates this information into actual payload. This payload information allows the truck to be operated efficiently near its maximum capacity without promoting undue vehicle wear. An overloaded vehicle hastens tire and frame damage.

Another system, as disclosed in U.S. Pat. No. 4,835,719 issued to Sorells on May 30, 1989 uses the same principals to predict when one additional bucket-load of material will fill the work vehicle to its rated capacity.

However, the apparatus disclosed in D. Foley et al does not account for the wear which occurs in the structs, tires, suspension, and frame of the vehicle. Wear on these components, increases the error in payload calculations over time. For example, wear on the strut will change the amount of friction present in the strut, thereby, increasing the error of payload calculations.

The present invention is directed at overcoming one or more of the problems as set forth above.

DISCLOSURE OF THE INVENTION

In one aspect of the invention an apparatus for measuring the load supported by a strut of a work vehicle is provided. The strut has a supporting relationship with a load carrying portion of the work vehicle. A pressure sensor senses the internal pressure of said strut and delivers a first signal responsive to the magnitude of said internal pressure. A microprocessor receives the first signal, detects a compression condition of the strut, and determines a pressure differential correlative to said compression condition. The microprocessor determines the load supported by the strut as a function of the pressure differential. The load is then recorded in memory.

In another aspect of the present invention, a method for measuring the load supported by a strut of a work vehicle is provided. The strut has a supporting relation with a load carrying portion of the work vehicle. The method includes the steps of sensing the internal pressure of said strut and delivering a pressure signal responsive to the magnitude of the strut pressure, receiving the pressure signal, detecting a compression condition of the strut in response, determining a pressure differential correlative to the compression condition, and determining the load supported by the strut as a function of the pressure differential.

BRIEF DESCRIPTION OF THE DRAWING

FIG. 1 is a diagrammatic view of an off-highway truck showing the location of critical suspension components;

FIG. 2 is a block diagram of the payload monitor;

FIG. 3 is an example of a graph illustrating the pressure of a strut during roading; and FIG. 4 is a flow diagram illustrating the operation of the payload monitor.

BEST MODE FOR CARRYING OUT THE INVENTION

Referring now to the drawings, wherein a preferred embodiment of the present apparatus 102 is shown, FIG. 1 illustrates a work vehicle 104 which can be, for example, an off-highway truck. The work vehicle 104 has at least one front and one rear strut 106,108 disposed in supporting relation to a load carrying portion 110 of the work vehicle 104. The preferred embodiment has two front and two rear struts 106L,106R,108L,108R which are the gas-over-liquid type commonly known in the industry and not described herein. It is sufficient in the understanding of the instant apparatus 102 to recognize that the pressure of the fluid is indicative of the magnitude of the load applied to the strut 106,108, and that wide swings in the strut pressures are normal and even expected during vehicle travel, commonly referred to as "roading".

The load carrying portion 110 includes a vehicular frame 112 and dump body 114. The dump body 114 is connected to the frame 112 by a pivot pin 116 and a hydraulic cylinder 118 such that the contents of the dump body 114 can be removed by controllably pressurizing the cylinder 118 to effect pivotal movement of the dump body 114 about the pivot pin 116. In the transport mode, the cylinder 118 is not pressurized and the weight of the dump body is transferred to the frame 112 through the pivot pin 116 and a support pad 120 fixed to the frame 112.

The work vehicle 104 further includes a ground engaging portion 122 and a suspension means 124 for supporting the load carrying portion 110 in a manner to provide damped oscillatory motion between the ground engaging portion 122 and the load carrying portion 110. Therefore, the force function of the road at time, t becomes:

$$f(t) = mx'' + Cx' + Kx,$$

where,
- m is the mass supported by the strut,
- C is the damping coefficient of the strut,
- k is the spring constant of the strut,
- x is the position of the strut,
- x' is the velocity of the strut, and
- x'' is the acceleration of the strut.

The suspension means 124 includes a rear axle housing 126 and an A-frame moment arm 128. The A-frame moment arm 128 has a first end portion 130 pivotally connected to the vehicular frame 112 by a socket 132, and a second end portion 134 fixedly connected to the rear axle housing 126. The first end portion 130 of the A-frame moment arm 128 is a king bolt arrangement, substantially spherical in shape and retained from lateral movement by the socket 132. The rear strut 108 has a first end portion 136 pivotally connected to the vehicular frame 112 and a second end portion 138 pivotally connected to the second end portion 134 of the A-frame moment arm 128.

During loading of the truck, as the payload increases, the load carrying portion 110 will be displaced in a direction toward the ground engaging portion 122. The rear strut 108 begins to compress while the A-frame moment arm 128 pivots about the first end portion 130. A distance L2 is defined to be the distance between the first end portion 130 pivot point and the second end portion 134 pivot point of the arm 128. Therefore, it can be shown that the rear strut pressure differential is a function of the suspension means 124. Moreover, the rear strut pressure differential can be related to the reaction force R between a work surface and the ground engaging portion 122. A force S experienced by the rear strut 108 can be determined by measuring the internal pressure of the strut 108, subtracting the rear strut pressure corresponding to an unloaded truck, and multiplying the differential pressure by the area of the strut 108. A reaction force R is proportional to the payload of the vehicle 104 and can be assumed to act through the center of the rear axle housing 126 such that a summation of the moments about the pivot point of the first end portion 130 would derive the following equation:

$$R = S*L2/L3$$

where the horizontal distance between the first end portion 130 pivot point and the center of rear axle housing 126 is defined to be L3.

Similarly, the front strut 106 will be compressed as the load increases; however, the front strut is connected directly between the frame 112 and a front axle housing 140. A more straightforward relationship exists here in that a force F experienced by the front strut 106 can be determined by measuring the internal pressure of the strut 106, subtracting the front strut pressure corresponding to an unloaded truck, and multiplying the pressure by the area of the strut 106. The reaction force F between the ground engaging portion 122 and the work surface is substantially equivalent to the force F experienced by the front strut 106.

The apparatus 102 is shown in FIG. 1 to illustrate the relationship between the work vehicle 104 and the location of the apparatus 102. A more detailed block diagram of the apparatus 102 is shown in FIG. 2 and diagrammatically illustrates a means 202 which senses the pressures of each of the struts 106,108 and delivers a plurality of signals each having a value responsive to the internal pressures of a respective strut and a logic means 200 for processing the pressure signals. The means 202 includes a plurality of pressure sensors 204,206,208,210 of the type commercially available from Dynasco as part number PT1206. The pressure sensors 204,206,208,210 are respectively associated with the two front struts 106L,106R and the two rear struts 108L,108R. Each of the pressure sensors 204,206,208,210 delivers an analog signal proportional to the magnitude of the pressure of the respective strut 106L,106R,108L,108R to respective analog to digital converters (A/D) 212,214,216,218. The A/D's 212,214,216,218 can be of the type commercially available from Analog Devices as part number AD575A. Other types of A/D converters have been contemplated by the inventor and the choice of the particular A/D disclosed herein is simply a matter of designer discretion. The selection of a device which provides an analog to frequency output is particularly well suited to the digital microprocessor environment disclosed herein; however, other similar devices could be easily substituted without departing from the spirit of the invention.

A peripheral interface adapter (PIA) 220 receives the digital frequencies output by the A/D converters 212,214,216,218 and delivers these signals to the logic means 200 under software control. In the preferred embodiment, the logic means 200 includes a microprocessor 222 under software control. One such suitable microprocessor is provided by Motorola Inc. of Roselle, IL (part number 6809). The logic means 200 modifies the front and rear strut pressure signals by applying respective unique correction factors thereto. These correction factors convert first signals, each having a value responsive to the internal pressure of one of said respective struts, into an indication of force or payload on an associated strut 106,108. The modified signals are transmitted via a second PIA 224 to a display means 228. The display means includes a first display driver 230 which controls a truck display 232 which is in the view of a truck operator. The first display driver receives the modified signals and controls the truck display 232 in response to the modified signals. The second PIA 224 also transmits modified signals to a communication link 234. The communications link 234 transmits the necessary information from the microprocessor 222 to a second display driver 236, which is associated with the loader. The driver 236 controls the loader's visual display 236 in response to the modified signals. The communication link 234 is preferably an infra-red link, but any suitable type of communications could be used without departing from the scope of the invention.

The second PIA 224 also transmits the modified signals to a memory means 226. The memory means 226 (shown as an EEPROM) receives the modified signals and stores the modified signals as indications of the work vehicle's payload.

A first indication of the actual total payload is calculated from a series of three equations during (or immediately following) the loading portion of a work cycle of the work vehicle 104. The front and rear payload components (R and F) are determined separately and then summed to determine a first payload value. In the preferred embodiment, R and F are functions of the signals from the respective pressure sensors 204,206,208,210 and correction factors. The correction factors herein are $L3/L2 \times A_r$ for the load supported by the rear strut and $A_f$ for the load supported by the front strut. $A_r$ and $A_f$ are the strut areas for the rear and front struts respectively. Additionally, offsets have been added to both the front and rear load calculations to compensate for offset introduced by the static friction in the struts 106,108.

A second indication of the actual total payload is calculated during the roading portion of the work vehicle's 104 work cycle. The second indication of the actual total payload is based on the damped oscillatory motion between the ground engaging portion 122 and the load carrying portion 110.

In one embodiment, the roading portion of the work vehicle's work cycle is discriminated from the loading portion by monitoring a speed sensor (not shown). The speed sensor gives an indication of whether or not the vehicle is in motion (loading only occurs while the vehicle is stopped). In a second embodiment, the loading portion of the work vehicle's work cycle is discriminated from the roading by monitoring one or more of the signals from pressure sensors 204,206,208,210. While the vehicle is motionless, the signals are substantially stable. During roading, the signals contain fluctuations due to the surface of the road and the tires.

With reference to FIG. 3, the second indication of the payload is determined during roading, i.e. the vehicle is in motion. More specifically, the second indication of payload is determined after the work vehicle has encountered a bump or hole in the road's surface. For simplicity, the following discussion follows the determination of the magnitude of load supported by a front strut 108 after encountering a bump in the road. The determination of the magnitude of load supported by the other struts 106,108 or after encountering a hole in the road is similar.

As shown, relatively smooth road conditions generate relatively small fluctuations (to the left of pressure point $P_{-1}$) in the pressure signals from the pressure sensors 204,206,208,210. At pressure point $P_{-2}$, the vehicle tire encounters a bump in the road surface and the strut compresses and the pressure within strut 106 increases rapidly (between pressure points $P_{-2}$ and $P_{-1}$). At pressure point, $P_{-1}$, the strut encounters "free fall". During free fall, the strut is allowed to expand without the effects of external forces, for example, the payload, the road surface. At pressure point $P_0$, the strut 106 is again compressed between the payload and the road. In the preferred embodiment, a compression condition is defined by the three sample pressure points, $P_0, P_1$, and $P_2$, as shown. It is from these three points, at which the effects of friction within the strut are minimal and substantially constant, that the second indication of the payload is calculated.

During roading, the pressure signal is sampled and monitored for conditions which match those of a compression condition corresponding to a bump in the road, as described above. When a match occurs, the load supported by the front strut 106 is calculated. In one embodiment, the load is calculated as mass in the International System of Units' (SI) unit of kilograms (kg). In another embodiment, the load is calculated as weight using the SI unit, Newton (N) or the English unit, pound (lb). The mass supported by the front strut 106 is calculated using the formula:

$$\frac{P_2 \times A^2 \times (\Delta t)^2}{v_0 \times (1 - 2 \times (P_0/P_1) + (P_0/P_2))}$$

where,
A is the area of the strut, and
$v_0$ is the initial volume of the strut. If the payload is to be calculated as weight or force, the above equation is multiplied by g, the gravitational constant.

The load supported by the other front strut 106 and the two rear struts 108 is calculated in a similar manner. The total payload is calculated as the sum of the loads supported by each individual strut 106,108. The total payload is saved as a second indicated load in the memory means 224. In the preferred embodiment, the first and second indicated loads are compared and the offset is used in succeeding calculations for the first indicated loads are modified to reflect changes in the work vehicle 104 due to wear.

With reference to FIG. 4, the basic operation of the payload monitor is shown during a typical work cycle. In block 402, a first determination of the payload is made during the loading portion of the work vehicle's work cycle. The first determination of the payload is based upon the strut pressures and the vehicle parameters (see discussion above).

In decision block 404, it is determined if the work vehicle is in the roading mode of the work cycle. This is accomplished by monitoring the strut pressures or the speed of the work vehicle 104. If the work vehicle 104 is not roading, control returns to block 402. In the work vehicle 104 is roading, control goes to decision block 406. In decision block 406, if a compression condition in any strut is detected, control goes to block 408. If no compression condition exists, control returns to decision block 406.

In block 408, the pressure differential corresponding to the compression condition of the strut is determined. And in block 410, the load supported by the strut is calculated based on the pressure differential.

In block 412, it is determined if the work vehicle 104 has completed the roading portion of the work cycle, that is, if the strut pressures are stable or the work vehicle has stopped moving. If the work vehicle 104 is still roading, control returns to block 406.

In block 414, the load supported by each individual strut is added together to determine a second indication of the total payload. In an alternate embodiment, the load supported by each strut is repeatedly calculated during roading. A filter averages the calculated loads supported by each individual strut or the calculated total payloads.

In block 416, the first and second indications of the payload are compared and the vehicle parameters are updated based on the difference.

INDUSTRIAL APPLICABILITY

With reference to the Figures and in operation, the present invention is adapted to determine the payload of a work vehicle 104 (mining truck). The mining truck 104 is loaded in a conventional manner by a loader (typically, a wheel type loader). The number of bucket loads needed to fill the load carrying portion 110 of the work vehicle 104 is dependent upon the size of the load carrying portion 110 and the size of the loader's bucket.

During loading, the payload is calculated based on the work vehicle's geometry and the sensed pressures in the struts (106,108). The payload is calculated as each bucketload of material is added to the load carrying portion 110 from the bucket loader. When the roading portion of the work vehicle's work cycle is detected, the last calculated payload is saved in the memory means 226, as the first indicated payload. The payload may be displayed in many different formats on the display means 228. For example, the display means may numerically display the total payload or may display it in a format showing the distribution of the load with respect to the load carrying portion 110.

During roading, a second indication of the total payload is determined (see above discussion). The second payload determination is also based upon the pressures seen in each strut 106,108. However, the second determined payload is more accurate because the dynamic friction in the strut is less than the static friction, and therefore, the errors introduced by friction in the struts are less. In other words, the dynamic friction in the strut 106,108 is negligible compared to the static friction.

Since the second indication of payload is more accurate, it is saved in the memory means 226 for the purpose of record keeping.

In some instances, it is more beneficial to have an accurate payload determination during the loading process. Therefore, the first and second indications of payload are compared and the vehicle parameters are updated (or controllably modified) to reflect the changes in the struts, tires, and suspension of the work vehicle 104 due to wear. This process increases the accuracy of the next payload determination during the loading portion of the work cycle.

We claim:

1. An apparatus for measuring the load supported by a strut of a work vehicle, the strut being disposed in supporting relation to a load carrying portion of the work vehicle, the measuring of said load occurring while the work vehicle is in motion, comprising:
   means for sensing the internal pressure of said strut and delivering a pressure signal responsive to the magnitude of said internal pressure;
   logic means for receiving said pressure signal, detecting a compression condition of said strut, determining a pressure differential correlative to said compression condition, determining the load supported by said strut as a function of said pressure differential, and delivering a load signal indicative of said load; and,
   memory means for receiving said load signal and recording said load signal as an indication of the magnitude of the load supported by said strut.

2. An apparatus, as set forth in claim 1, wherein said pressure differential includes at least three pressure samples ($P_0, P_1, P_2$) separated by a constant time differential ($\Delta t$).

3. An apparatus, as set forth in claim 2, wherein, the mass of the load supported by said strut is determined using the formula:

$$\frac{P_2 \times A^2 \times (\Delta t)^2}{v_0 \times (1 - 2 \times (P_0/P_1) + (P_0/P_2))}$$

where,
A is the area of the strut, and
$v_0$ is the initial volume of the strut.

4. An apparatus for measuring the payload carried by a work vehicle, the work vehicle having at least one front strut and one rear strut disposed in supporting relation to a load carrying portion of the work vehicle, the measuring of said payload occurring while the work vehicle is in motion, comprising:
   means for separately sensing the internal pressure of said front and rear struts and delivering first and second pressure signals respectively responsive to the magnitude of said front and rear strut pressures;
   logic means for receiving said first pressure signal, detecting a compression condition of said front strut, determining a first pressure differential in response to said compression condition of said front strut, determining the load supported by said front strut as a function of said first pressure differential, and for receiving said second pressure signal, detecting a compression condition of said rear strut, determining a second pressure differential in response to said compression condition of said rear strut, determining the load supported by said rear strut as a function of said first pressure differential, and for determining the payload supported by the load carrying portion by summing the loads supported by each strut and delivering a payload signal indicative of the payload of the payload carried by said work vehicle; and
   memory means for receiving said payload signal and recording said payload signal as an indication of the magnitude of the payload carried by said work vehicle.

5. An apparatus, as set forth in claim 4, including means for receiving said payload signal and displaying said payload signal as in indication of the payload of said work vehicle.

6. An apparatus for determining the payload carried by a work vehicle, the work vehicle having at least one strut disposed in supporting relation to a load carrying portion of the work vehicle, comprising:
   means for sensing the internal pressure of said strut and delivering a pressure signal responsive to the magnitude of said strut pressure;
   logic means for receiving said pressure signal, determining a first indication of said payload as a function of said pressure signal and a set of vehicle parameters, and delivering a first payload signal in response to said first indicated payload and for determining a roading condition of said work vehicle, detecting a compression condition of said strut (106,108) in response to detecting said roading condition, determining a pressure differential correlative to said compression condition, determining a second indication of said payload as a function of said pressure differential, and delivering a second payload signal in response to said second indicated payload;

memory means for receiving said second payload signal and recording said second indicated payload in response thereto;

and wherein said logic means includes means for receiving said first and second payload signals, comparing said first and second payload signals, producing an offset signal in response to the magnitude of the difference between said first and second payload signals, and controllably modifying said vehicle parameters in response to said offset signal.

7. An apparatus, as set forth in claim 6, including means for receiving said second payload signal and displaying said second indicated payload as an indication of the payload of said work vehicle.

8. An apparatus, as set forth in claim 6, wherein said memory means includes means for receiving said first payload signal and recording said first indicated payload in response thereto.

9. A method for measuring the load supported by a strut of a work vehicle, the strut being disposed in supporting relation to a load carrying portion of the work vehicle, the measuring of said load occurring while the work vehicle is in motion, comprising the steps of:

sensing the internal pressure of said strut and delivering a pressure signal responsive to the magnitude of said strut pressure;

receiving said pressure signal and detecting a compression condition of said strut;

determining a pressure differential correlative to said compression condition;

determining the load supported by said strut as a function of said pressure differential; and recording the magnitude of said strut supported load.

10. The method, as set forth in claim 9, wherein the step of determining a pressure differential includes the step of obtaining at least three samples ($P_0, P_1, P_2$) of said signal, said samples separated by a constant time differential ($\Delta t$).

11. The method, as set forth in claim 10, wherein the step of determining the load includes the step of calculating the mass of the load by the formula:

$$\frac{P_2 \times A^2 \times (\Delta t)^2}{v_0 \times (1 - 2 \times (P_0/P_1) + (P_0/P_2))},$$

where,

A is the area of the strut, and $v_o$ is the initial volume of the strut.

12. A method for measuring the payload carried by a work vehicle, the work vehicle having at least one front strut and one rear strut disposed in supporting relation to a load carrying portion of the work vehicle, the measuring of said payload occurring while the work vehicle is in motion, comprising the steps of:

separately sensing the internal pressure of said front and rear struts and delivering first and second pressure signals respectively responsive to the magnitude of said front and rear strut pressures;

receiving said first pressure signal, detecting a compression condition of said front strut, determining a first pressure differential correlative to said compression condition of said front strut, and determining the load supported by said front strut as a function of said first pressure differential;

receiving said second pressure signal, detecting a compression condition of said rear strut, determining a second pressure differential correlative to said compression condition of said rear strut, and determining the load supported by said rear strut as a function of said first pressure differential;

determining the payload by summing the loads supported by each strut and delivering a payload signal indicative of the payload carried by said work vehicle; and receiving said payload signal and recording said payload signal as an indication of the magnitude of the payload carried by said work vehicle.

13. A method for determining the payload carried by a work vehicle, the work vehicle having at least one strut disposed in supporting relation to a load carrying portion of the work vehicle, comprising:

sensing the internal pressure of said strut and delivering a pressure signal responsive to the magnitude of said strut pressure;

receiving said pressure signal, determining a first indication of said payload as a function of said pressure signal and a set of vehicle parameters, and delivering a first payload signal in response to said first indicated payload;

determining a roading condition of said work vehicle, detecting a compression condition of said strut in response to detecting said roading condition, determining a pressure differential correlative to said compression condition, determining a second indication of said payload as a function of said pressure differential, and delivering a second payload signal in response to said second indicated payload;

receiving said second payload signal and recording said second indicated payload in response thereto; and comparing said first and second payload signals, producing an offset signal in response to the magnitude of the difference between said first and second payload signals, and updating said vehicle parameters in response to said offset signal.

14. A method, as set forth in claim 13, including the step of receiving said first payload signal and recording said first indicated payload in response thereto.

* * * * *